US007676928B2

(12) United States Patent
Misu et al.

(10) Patent No.: US 7,676,928 B2
(45) Date of Patent: Mar. 16, 2010

(54) METHOD FOR USE IN THE MANUFACTURING OF A FLUID DYNAMIC PRESSURE BEARING

(75) Inventors: Isao Misu, Kyoto (JP); Masaaki Uchiyama, Kyoto (JP)

(73) Assignee: Nidec Corporation, Kyoto (JP)

( * ) Notice: Subject to any disclaimer, the term of this patent is extended or adjusted under 35 U.S.C. 154(b) by 54 days.

(21) Appl. No.: 11/954,552

(22) Filed: Dec. 12, 2007

(65) Prior Publication Data

US 2008/0209732 A1 Sep. 4, 2008

Related U.S. Application Data

(62) Division of application No. 10/710,343, filed on Jul. 2, 2004, now Pat. No. 7,328,511.

(30) Foreign Application Priority Data

| Jul. 2, 2003 | (JP) | ............... 2003-190526 |
| Jun. 14, 2004 | (JP) | ............... 2004-175386 |

(51) Int. Cl.
| B21K 1/10 | (2006.01) |
| B21D 53/10 | (2006.01) |
| B65B 31/00 | (2006.01) |
| B65B 31/04 | (2006.01) |
| B65B 1/08 | (2006.01) |
| F16C 32/06 | (2006.01) |

(52) U.S. Cl. ............... 29/898.02; 29/898.1; 29/724; 141/7; 141/65; 141/67; 384/100

(58) Field of Classification Search ............ 29/724, 29/898.02, 898.1; 141/4, 7, 8, 31, 65, 67; 184/7.4; 222/420; 384/100

See application file for complete search history.

(56) References Cited

U.S. PATENT DOCUMENTS

| 5,575,355 A | * | 11/1996 | Williams et al. ............ 184/55.1 |
| 5,601,125 A | | 2/1997 | Parsoneault et al. |
| 5,778,948 A | | 7/1998 | Gomyo et al. |
| 5,894,868 A | | 4/1999 | Wuester, Sr. |
| 6,733,180 B2 | | 5/2004 | Nakamura |
| 2004/0107577 A1 | | 6/2004 | Hayashi et al. |

(Continued)

FOREIGN PATENT DOCUMENTS

JP     H08-270653 A     10/1996

(Continued)

*Primary Examiner*—David P Bryant
*Assistant Examiner*—Alexander P Taousakis
(74) *Attorney, Agent, or Firm*—Volentine & Whitt, PLLC

(57) ABSTRACT

Oil which will serve as a lubricating fluid of a fluid dynamic pressure bearing is degassed in a first environment under a first pressure which is lower than atmospheric pressure. First and second members of the bearing are place in a second environment under a pressure lower than atmospheric pressure and higher than the pressure in the first environment. The degassed oil is supplied to the gap between bearing surfaces of the first and second members while the first and second members are in the second environment under pressure lower than atmospheric pressure and higher than the pressure in the first environment. Subsequently the pressure in the second environment is increased to force the oil into the gap between the bearing surfaces of the first and second members of the hydrodynamic fluid.

8 Claims, 2 Drawing Sheets

U.S. PATENT DOCUMENTS

2004/0256178 A1 * 12/2004 Neumann et al. ............ 184/7.4

FOREIGN PATENT DOCUMENTS

| | | |
|---|---|---|
| JP | H09-014256 A | 1/1997 |
| JP | H11-141540 A | 5/1999 |
| JP | 2001-165153 A | 6/2001 |
| JP | 2002-005170 A | 1/2002 |
| JP | 2002-174242 A | 6/2002 |
| JP | 2002-213452 A | 7/2002 |
| JP | 2002-327748 A1 | 11/2002 |

* cited by examiner

METHOD FOR USE IN THE MANUFACTURING OF A FLUID DYNAMIC PRESSURE BEARING

CROSS-REFERENCE TO RELATED APPLICATION

This is a divisional of U.S. non-provisional application Ser. No. 10/710,343, filed Jul. 2, 2004, which is incorporated herein by reference in its entirety.

BACKGROUND OF INVENTION

1. Field of the Invention

The present invention relates to a method for use in the manufacturing of a fluid dynamic pressure bearing, and more particularly to a method of filling oil into a bearing gap.

2. Description of Related Art

Various fluid dynamic pressure bearings have been proposed for high rotational precision motors. Examples of such motors include spindle motors of recording disk drives, and motors used to drive polygon mirrors in laser beam printers. Generally, fluid dynamic pressure bearings utilize fluid pressure of lubricating fluid such as oil or the like interposed between a shaft and a sleeve which are rotatable relative to one another.

FIG. 1 shows one example of a motor using such a fluid dynamic pressure bearing. A motor using the conventional fluid dynamic pressure bearing comprises a pair of radial bearing sections 4, 4, formed so as to be spaced apart from each other in the axial direction, between an outer peripheral surface of a shaft 2 that is integrally formed with a rotor 1 and an inner peripheral surface of a sleeve 3 in which the shaft 2 is rotatably inserted. Further, a pair of thrust bearing sections 7, 7 are disposed respectively between an upper surface of a disk-like thrust plate 5 that projects from the outer peripheral surface of one edge section of the shaft 1 in the outward direction of the radius direction and a flat surface of a step portion formed on the sleeve 2, and between the lower surface of the thrust plate 5 and a thrust bush 6 that closes one opening of the sleeve 2.

A bearing gap that is a series of minute gaps is formed between the shaft 2 and the thrust plate 5 and between the sleeve 3 and the thrust bush 6. Oil 9 serving as lubricating fluid is continuously retained in the bearing gap without a break.

Herringbone grooves 41, 41 and 71, 71 formed by joining a pair of spiral grooves are formed at the radial bearing sections 4, 4 and the thrust bearing sections 7, 7, whereby maximum dynamic pressure is produced according to the rotation of the rotor 1 at the central section of the bearing section where a joint section of the spiral groove is positioned, thereby counteracting a load on the rotor 1.

The motor described above has a taper seal section 8 in the vicinity of the upper edge section of the sleeve 3 that is positioned opposite to the thrust bearing sections 7, 7 in the axial direction, so that the surface tension of the oil and the atmospheric pressure are balanced to form an interface. Specifically, the internal pressure of the oil in this taper seal section 8 is maintained at a pressure substantially equal to the atmospheric pressure.

The following method has been proposed for filling the oil 9 retained between the thrust plate 5 and the shaft 2 and between the sleeve 3 and the thrust bush 6 of the bearing section having the above-mentioned construction. Firstly, a vacuum chamber having the oil stored therein is pressure-reduced, and then, with this state, a stirring machine in the oil is operated to perform a stirring and degassing. After the pressure in the vacuum chamber that supports the bearing is reduced to a vacuum level, the oil is supplied to the bearing-supporting vacuum chamber, and a suitable amount of oil is placed at the bearing opening such as the taper seal section 8 or the like of the bearing section under a reduced pressure Subsequently, the environment in the bearing-supporting vacuum chamber is returned to the atmospheric pressure, thereby filling the oil in the bearing gap of the fluid dynamic pressure bearing by utilizing the atmospheric pressure.

However, even in the oil filling method as described above, the oil often bubbles during the filling process. This is because it is extremely difficult, particularly in a mass production process in a factory, to remove the dissolved air to a degree of not forming air bubbles even by stirring and degassing the oil under the reduced pressure. The oil bubbling during the oil filling process hinders a smooth supply from the vacuum chamber having the oil stored therein to the bearing-supporting vacuum chamber. Further, when bubbling occurs at the stage where the oil reaches the bearing-supporting vacuum chamber, the oil may be scattered in a spraying manner in the oil vacuum chamber, thereby staining the bearing and the inside of the chamber with the oil.

The degassing level of the oil is somewhat enhanced by exposing the oil under the reduced pressure environment and performing stirring and degassing. However, effective degassing cannot be carried out by degassing under a state where the oil is stored in the vacuum chamber, since the area exposed to the reduced pressure environment to the volume of the oil, i.e., the surface area of the oil is limited. In this case, it is possible to increase the area to the volume of the oil by using a large-sized vacuum chamber, or by decreasing the amount of oil stored in the chamber. However, these are not realistic solutions since they deteriorate productivity by increasing the size of the oil filling device or by increasing an oil replenishing frequency.

SUMMARY OF INVENTION

The present invention aims to provide a method for use in the manufacturing of a fluid dynamic pressure bearing that can prevent or reduce the likelihood of air bubbles during an oil filling process.

In the method of an embodiment according to the present invention, a first vacuum chamber, that stores oil and performs a degassing, is pressure-reduced, and at least at the time of completing the pressure-reduction, the pressure in the first vacuum chamber is made smaller than the pressure in a second vacuum chamber at the time of the operation of supplying the oil into a bearing. This provides that higher pressure is applied on the oil upon the operation of supplying the oil than upon the operation of degassing the oil. The higher pressure restrains the occurrence of air bubbles in the oil at the supplying operation.

According to another embodiment of the present invention, even after the first vacuum chamber is pressure-reduced to obtain a pressure not more than a predetermined pressure, the reduced-pressure state is kept, and with this state, oil is supplied to a second vacuum chamber to thereby fill in the bearing. The predetermined pressure in the first vacuum chamber is smaller than the pressure in a second vacuum chamber at the time of the operation of supplying the oil into a bearing. The first vacuum chamber is kept to be pressure-reduced, whereby a more perfect degassing of oil can be attained.

In the present invention, a valve mechanism or pump mechanism for sending the oil to the second vacuum chamber may be disposed on the way of a pipe that joins the first vacuum chamber and the second vacuum chamber. The oil can be sent to the second vacuum chamber by this valve or pump against the pressure difference. Thus, the oil is supplied to the second vacuum chamber more certainly.

In the present invention, gravity may be used for supplying the oil. This can provide a smooth supply of oil. For example, supposing that the density of the oil is about 1 g/cm³, the pressure can be increased by 1000 Pa due to the height difference of 10 cm. Making a suitable height difference enables oil to be supplied to the second vacuum chamber against the pressure difference between the first vacuum chamber and the second vacuum chamber. Employing the valve mechanism in this apparatus can provide an accurate supply of oil.

In the present invention, oil may be dripped into the first vacuum chamber. Oil is dripped, whereby the surface per volume exposed to the reduced pressure environment is temporarily increased, thereby promoting the degassing. Further, droplets of oil impinging on the bottom of the chamber or on the liquid level of the stored oil become a more minute splash. This phenomena also assists the degassing of oil.

DETAILED DESCRIPTION

Figure 1:
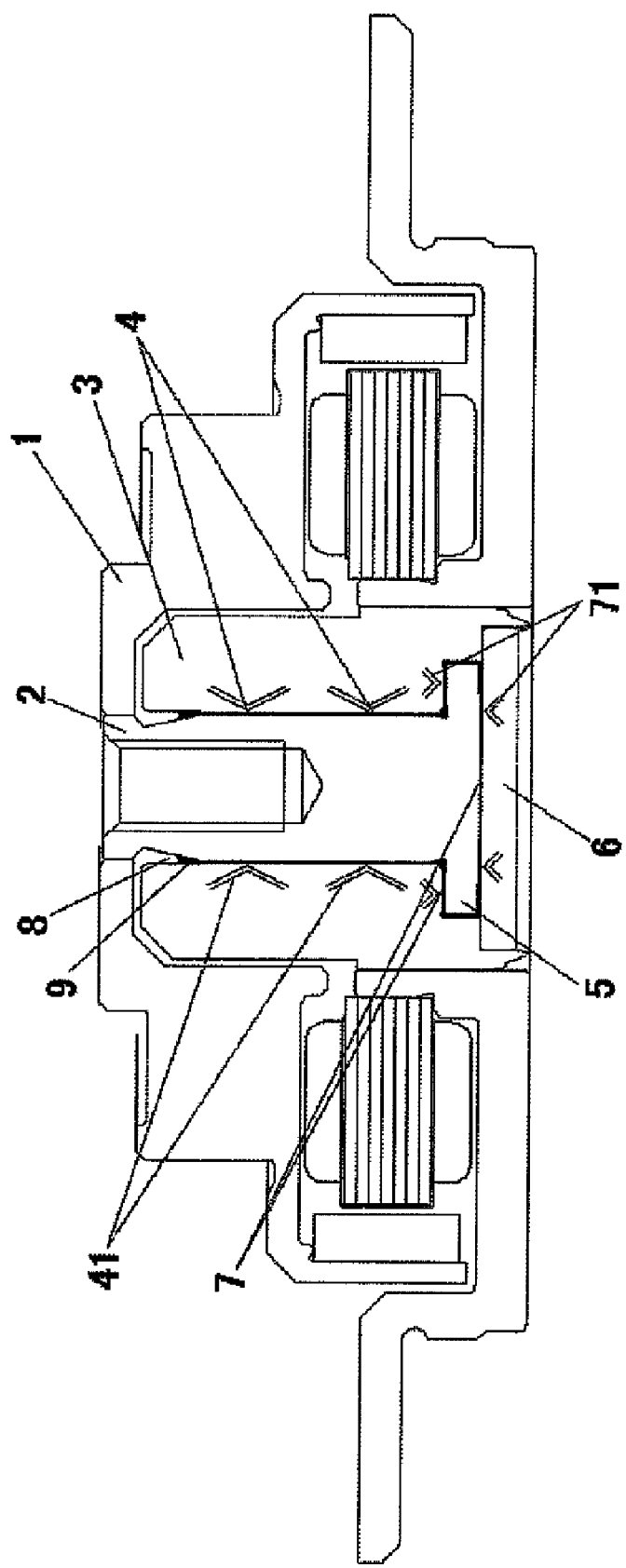
FIG. 1 is a sectional view of a motor having a fluid dynamic pressure bearing.
Figure 2:
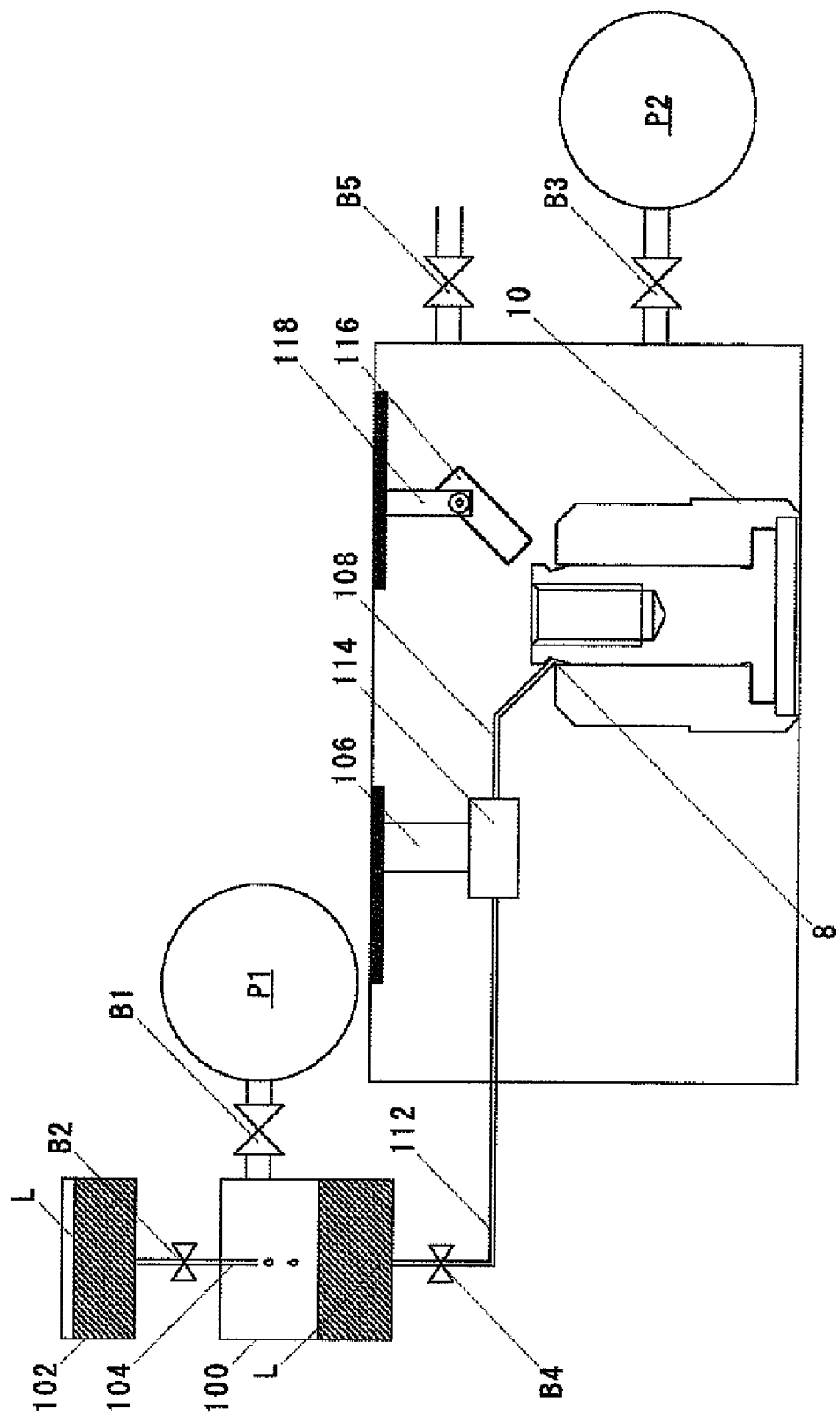
FIG. 2 is a schematic diagram of an oil filling apparatus for carrying out an embodiment of a method of filling a bearing with oil according to the present invention.

A manufacturing method of a fluid dynamic pressure bearing device according to an embodiment of the present invention will be explained with reference to drawings. It should be noted that the fluid dynamic pressure bearing 10 of FIG. 2 is the same as that previously described with reference to FIG. 1, and accordingly a detailed description thereof is omitted below to avoid redundancy in the description.

In the method according to the embodiment, a valve B1 is firstly opened and a vacuum pump P1 is operated, whereby air in a first vacuum chamber 100 that is an oil tank is exhausted to be pressure-reduced to a predetermined degree of vacuum PL1. After the reduced pressure level in the first vacuum chamber 100 is confirmed to reach the degree of vacuum PL1, a valve B2 is opened to thereby start a supply of oilL from an oil supplying chamber 102 to the first vacuum chamber 100. At this time, a capillary 104 for supplying the oilL from the oil supplying chamber 102 to the first vacuum chamber 100 has a needle shape having a diameter to a degree in which the oily is retained by a capillary phenomena. Further, pressure PL2 in the oil supplying chamber 102 is kept to be slightly higher than the reduced pressure level PL1 in the first vacuum chamber 100. Accordingly, the oilL retained in the capillary 104 is dripped as droplets into the first vacuum chamber 100 due to the pressure difference between the first vacuum chamber 100 and the oil supplying chamber 102.

The oilL is naturally dripped into the first vacuum chamber 100 with its internal pressure higher than the reduced pressure level PL1 due to the pressure difference between the reduced pressure level PL1 in the first vacuum chamber 100 and the pressure PL2 in the oil supplying chamber 102. Therefore, the oilL enters into the first vacuum chamber 100 from the capillary 104 as a droplet, and at the same time, air dissolved in the oilL expands by a cavitation phenomena to form air bubbles. However, the oilL is dripped from the capillary 104 having a diameter to a degree in which the capillary phenomena is acted, whereby the volume of the oilL dripping as a droplet is extremely small. On the other hand, the entire surface of the dripped oilL is exposed to the vacuum environment under the reduced pressure level PL1, so that air bubbles are easily opened in the first vacuum chamber 100, thereby degassing the oilL.

Droplets of oilL impinging on the bottom of the first vacuum chamber 100 or on the liquid level of the oilL previously dripped and stored in the first vacuum chamber 100 become a more minute splash to be scattered, thereby further promoting the degassing. Therefore, the degassing process of the oilL by the drip that also uses the vacuum degassing as described above is more efficient compared to the conventional degassing process using only the vacuum degassing or the degassing process using both the vacuum degassing and the degassing by stirring. Thus, the air dissolved in the oil is surely eliminated.

When the oilL of a predetermined amount is stored in the first vacuum chamber 100, the fluid dynamic pressure bearing 10 having no oil filled therein is inserted into a second vacuum chamber 106, that is an oil injecting chamber, from an opening not shown and is placed at the predetermined position. After the opening is closed, a valve B3 is opened, and then, a vacuum pump P2 starts to exhaust air in the second vacuum chamber 106 and the bearing gap of the fluid dynamic pressure bearing 10. When the pressure in the second vacuum chamber 106 reaches a reduced pressure level PL3 set in advance, the valve B3 is closed and the vacuum pump P2 is stopped to thereby start the filling of the oilL. It should be noted that the pressure in the second vacuum chamber 106 can be reduced by using the vacuum pump P1 that is used for pressure-reducing the first vacuum chamber 100.

In order to perform the filling of the oilL, an oil injecting opening 108 is firstly positioned above the taper seal section 8 of the fluid dynamic pressure bearing 10 by moving in parallel or by rotating a movable member 110. Thereafter, a valve B4 is opened to supply the degassed oil stored in the first vacuum chamber 100 via a pipe 112. In this case, a needle valve 114 (for example, BP-107D manufactured by Ace Giken Co., Ltd.) is operated in order to accurately send a first amount of oil V1 set in advance to the oil injecting opening 108.

Then, the oilL supplied from the first vacuum chamber 100 to the needle valve 114 is dripped into the taper seal section 8 of the fluid dynamic pressure bearing 10 from the oil injecting opening 108. Next, a valve B5 is opened for a predetermined time to flow in dust-proof open air by filter means or the like, and then, the pressure in the second vacuum chamber 106 is increased from the reduced pressure level PL3. At this time, the bearing gap of the fluid dynamic pressure bearing 10 is in a state of being sealed by the oilL dripped into the taper seal section 8, so that the pressure in the bearing gap is kept to be the reduced pressure level PL3. Therefore, a pressure difference occurs between the pressure in the bearing gap and the increased pressure in the second vacuum chamber 106, by which the amount of dripped oil V1 is pressed into the bearing gap.

Subsequently, a camera 116 is moved to a position where the inside of the taper seal section 8 can be observed by moving in parallel or rotating a movable member 118, observing the amount of the oilL filled in the bearing gap by the above-mentioned process. A second amount of oil V2, that is an adding amount of oil required to supply an optimum amount of oilL to the fluid dynamic pressure bearing 10, is determined based upon the result of this observation. Then, the valve B3 is opened again and the vacuum pump P2 is operated, whereby the air in the vacuum chamber 106 is exhausted to reduce the pressure therein to the reduced pressure level PL3. After this pressure-reduction is completed again, the second oil amount V2 is filled again in the bearing gap by the same manner as the filling process of the oil amount V1.

The fluid dynamic pressure bearing 10 to which the filling of the predetermined amount of oilL is completed as described above is taken away from the second vacuum chamber 106 from the opening section not shown. Although the above-mentioned explanation is made about the case where the filling of the oilL to the fluid dynamic pressure bearing 10 is performed two times, it can be carried out three times or more. Further, the oil is filled in the bearing gap in a somewhat greater amount than the predetermined oil filling amount, and the excessive filling amount may be absorbed and collected by confirming the interface position of the oilL in the taper seal section 8 by the camera 116.

The important point in the filling of the oilL to the bearing gap is that the pressure in the first vacuum chamber 100 is surely reduced to be lower than the pressure in the second vacuum chamber 106, i.e., the relationship of the reduced pressure level PL1>reduced pressure level PL3 is established, at the time of completing the pressure-reduction.

In case where the relationship between the reduced pressure level PL1 and PL3 in each vacuum chamber 100 and 106 is such that the reduced pressure level PL1<reduced pressure level PL3, i.e., in case where the pressure in the first vacuum chamber 100 is higher than the pressure in the second vacuum chamber 106, upon supplying the oilL to the second vacuum chamber 106 from the first vacuum chamber 100, slightly remaining air in the oilL forms air bubbles by a cavitation phenomena due to the pressure difference, thereby spouting out in the second vacuum chamber 106 from the oil injecting opening 108. In case where the fluid dynamic pressure bearing 10 is applied as a bearing device for a motor in a hard disk drive device or the like used under a clean environment, the spouting oilL kept to be adhered pollutes the clean environment. Therefore, it is required to wipe the inside of the second vacuum chamber 106 or the surface of the fluid dynamic pressure bearing 10. Moreover, in case where the bubbling phenomena is caused in the pipe 112, the oilL is broken by the air bubbles in the pipe 112, so that the oilL cannot smoothly be supplied toward the oil injecting opening 108. These problems cause a serious reduction in productivity of the fluid dynamic pressure bearing 10.

On the other hand, the relationship of PL1>PL3 is established between the reduced pressure level PL1 in the first vacuum chamber 100 and the reduced pressure level PL3 in the second vacuum chamber, whereby the oilL is transported toward the side where the pressure is higher (the degree of vacuum is lower) successively during the oil filling process, thereby being capable of surely preventing the occurrence of bubbling phenomena. In this case, the pressure in the second vacuum chamber 106 wherein the oil is filled into the bearing gap of the fluid dynamic pressure bearing 10 is reduced to be not more than 1000 Pa, and more preferably to be about 1000 Pa, whereby air is prevented again from going into solution in the oilL when the oilL is dripped from the oil injecting opening 108 into the taper seal section 8 of the fluid dynamic pressure bearing 10 to thereby be filled in the bearing gap. Therefore, the filling process of the oilL is completed without deteriorating the degassing level of the oil L. Accordingly, the occurrence of air bubbles can be restrained even after the operation is started with the fluid dynamic pressure bearing 10 built in as a bearing device of a motor.

It should be noted that, in this case, the reduced pressure in the first vacuum chamber 100 whose pressure is reduced to the reduced pressure level PL1 that is higher than the reduced pressure level PL3 in the second vacuum chamber 106 is preferably set to be not more than 30 Pa. Setting the reduced pressure level PL1 in the first vacuum chamber 100 to be higher as described above makes it possible to enhance the degassing level in the degassing process of the oilL by the above-mentioned dripping.

Although the embodiment of the manufacturing method of the fluid dynamic pressure bearing according to the present invention has been explained above, the invention is not limited to the embodiment. Various modifications or amendments are possible without departing from the scope of the invention, and further, the invention can be applied to fluid dynamic pressure bearings having various configurations.

What is claimed is:

1. A method for use in the manufacturing of a fluid dynamic pressure bearing, the bearing comprising a shaft having a bearing surface and a sleeve having a bearing surface, wherein the shaft is received within the sleeve, and wherein the bearing surfaces of the shaft and sleeve confront and are spaced from one another, whereby a gap is defined between the bearing surface of the shaft and the bearing surface of the sleeve, said method comprising:

storing oil, which will serve as a lubricating fluid of the fluid dynamic pressure bearing, in a first vacuum chamber, and evacuating the first chamber to establish a pressure in the first vacuum chamber which is lower than atmospheric pressure;

placing the shaft and sleeve of the fluid dynamic pressure bearing in a second vacuum chamber, and evacuating the second vacuum chamber to establish a pressure in the second vacuum chamber which is lower than atmospheric pressure;

terminating the evacuation of the first and second vacuum chambers at such a time that the pressure in the first vacuum chamber is equal to or less than the pressure in the second vacuum chamber; and while the pressure in each of the first and second vacuum chambers is lower than atmospheric pressure, and the pressure in the first vacuum chamber is equal to or less than the pressure in the second vacuum chamber, feeding the oil from the first vacuum chamber into the second vacuum chamber via piping that places the first and second vacuum chambers in communication with one another and terminates adjacent the gap defined between the bearing surfaces of the shaft and sleeve, thereby supplying the oil to the fluid dynamic pressure bearing.

2. The method according to claim 1, wherein the supplying of the oil to the fluid dynamic pressure bearing comprises opening a valve disposed in the piping.

3. The method according to claim 1, wherein the liquid level of the oil stored in the first vacuum chamber is higher than the fluid dynamic pressure bearing, when the oil is supplied through the piping to the fluid dynamic pressure bearing.

4. A method according to claim 1, further comprising dripping the oil into the first vacuum chamber while the pressure in the first vacuum chamber is lower than atmospheric pressure to degas the oil.

5. A method according to claim 1, wherein the pressure established in the second vacuum chamber is not more than 1000 Pa.

6. A method for use in the manufacturing of a fluid dynamic pressure bearing, the bearing including a first member having a bearing surface, and a second member having a bearing surface, the first and second member being supported relative to one another such that the bearing surfaces thereof confront and are spaced from one another, whereby a gap is defined between the bearing surfaces, the method comprising:

degassing oil, which will serve as a lubricating fluid of the fluid dynamic pressure bearing, in a first environment under a first pressure which is lower than atmospheric pressure;

placing the first and second members in a second environment under a pressure lower than atmospheric pressure and equal to or higher than the pressure in the first environment; and supplying the degassed oil to the gap between the bearing surfaces of the first and second members of the fluid dynamic pressure bearing while the first and second members are in the second environment under pressure lower than atmospheric pressure and equal to or higher than the pressure in the first environment; and subsequently increasing the pressure in the second environment to force the oil into the gap between the bearing surfaces of the first and second members of the hydro dynamic fluid.

7. The method as claimed in claim 6, wherein the increasing of the pressure in the second environment comprises feeding air into the second environment.

8. A method according to claim 6, wherein the degassing of the oil comprises dripping the oil into the first environment while the pressure in the first environment is lower than atmospheric pressure to degas the oil.

* * * * *